United States Patent
McAndrews (10) Patent No.: US 6,991,076 B2
(45) Date of Patent: Jan. 31, 2006

(54) BICYCLE DAMPING ENHANCEMENT SYSTEM

(75) Inventor: Michael McAndrews, Santa Cruz, CA (US)

(73) Assignee: Specialized Bicycle Components, Inc., Morgan Hill, CA (US)

(*) Notice: Subject to any disclaimer, the term of this patent is extended or adjusted under 35 U.S.C. 154(b) by 0 days.

(21) Appl. No.: 10/811,784

(22) Filed: Mar. 29, 2004

(65) Prior Publication Data

US 2005/0023094 A1 Feb. 3, 2005

Related U.S. Application Data

(63) Continuation of application No. 09/919,582, filed on Jul. 31, 2001, now Pat. No. 6,722,678, which is a continuation of application No. 09/288,003, filed on Apr. 6, 1999, now Pat. No. 6,267,400.

(51) Int. Cl.
*F16F 9/34* (2006.01)

(52) U.S. Cl. ............... 188/275; 188/166.2; 188/282.8

(58) Field of Classification Search ............ 188/266.2, 188/266.6, 275, 282.8, 297, 302, 303, 304, 188/305, 313, 314, 318; 380/285
See application file for complete search history.

(56) References Cited

U.S. PATENT DOCUMENTS

| | | | |
|---|---|---|---|
| 1,492,328 A | 4/1924 | Lang | |
| 2,311,993 A | 2/1943 | Olsen | |
| 3,062,330 A | 11/1962 | Lyon, Jr. | |
| 3,127,958 A | 4/1964 | Szostak | |
| 3,696,894 A | 10/1972 | Brady et al. | |
| 4,082,169 A | 4/1978 | Bowles | |
| 4,126,302 A | 11/1978 | Curnutt | |
| 4,127,038 A | 11/1978 | Browning | |
| 4,153,237 A * | 5/1979 | Supalla | 267/64.15 |
| 4,492,290 A | 1/1985 | Zavodny | |
| 4,572,317 A * | 2/1986 | Isono et al. | 180/227 |
| 4,580,997 A | 4/1986 | Browning et al. | |
| 4,592,738 A | 6/1986 | Nagano | |
| 4,679,811 A | 7/1987 | Shuler | |
| 4,790,554 A | 12/1988 | Siegwart, Jr. | |
| 4,807,860 A | 2/1989 | Simons | |
| 4,917,222 A | 4/1990 | Bacardit | |
| 5,000,470 A | 3/1991 | Kamler et al. | |

(Continued)

FOREIGN PATENT DOCUMENTS

DE 41 23 643 A1 6/1992

(Continued)

OTHER PUBLICATIONS

European Patent Office, European Search Report, Application No. EP 03 01 5960, dated Nov. 15, 2004, Examiner M. Grunfeld.

(Continued)

*Primary Examiner*—Devon C. Kramer
(74) *Attorney, Agent, or Firm*—Knobbe Martens Olson & Bear LLP (57) ABSTRACT

A bicycle shock absorber for differentiating between rider-induced forces and terrain-induced forces includes a first fluid chamber having fluid contained therein, a piston for compressing the fluid within the fluid chamber, a second fluid chamber coupled to the first fluid chamber by a fluid communication hose, and an inertial valve disposed within the second fluid chamber. The inertial valve opens in response to terrain-induced forces and provides communication of fluid compressed by the piston from the first fluid chamber to the second fluid chamber. The inertial valve does not open in response to rider-induced forces and prevents communication of the fluid compressed by the piston from the first fluid chamber to the second fluid chamber.

12 Claims, 11 Drawing Sheets

U.S. PATENT DOCUMENTS

| | | |
|---|---|---|
| 5,080,392 A | 1/1992 | Bazergui |
| 5,285,875 A | 2/1994 | Munoz |
| 5,332,068 A | 7/1994 | Richardson et al. |
| 5,337,864 A | 8/1994 | Sjöström |
| 5,509,679 A | 4/1996 | Leitner |
| 5,598,903 A | 2/1997 | Richardson |
| 5,678,837 A | 10/1997 | Leitner |
| 5,823,305 A | 10/1998 | Richardson et al. |
| 5,921,572 A | 7/1999 | Bard et al. |
| 5,954,167 A | 9/1999 | Richardson et al. |
| 6,105,987 A | 8/2000 | Turner |
| 6,119,830 A | 9/2000 | Richardson et al. |
| 6,213,263 B1 | 4/2001 | De Frenne |
| 6,267,400 B1 * | 7/2001 | McAndrews ............... 280/285 |
| 6,581,948 B2 | 6/2003 | Fox |
| 6,722,678 B2 * | 4/2004 | McAndrews ............... 280/285 |

FOREIGN PATENT DOCUMENTS

| | | |
|---|---|---|
| FR | 1125267 | * 10/1956 |
| JP | 59106734 | 6/1984 |
| WO | WO 99/31403 | 6/1999 |

OTHER PUBLICATIONS

U.S. District Court, Central District of California, Complaint for Patent Infringement.

U.S. District Court, Central District of California, Motion for Sanctions under Rule 11 and supporting Declarations of Micheal T. Mete, Jason H. Foster and Darek Barefoot.

English Translation of French Patent No. 1125267 to Gatter, dated Oct. 1956, cited in Office Action mailed Jun. 06, 2005.

U.S. District Court, Central District of California, Order Denying Motion For Sanctions, Aug. 8, 2005.

U.S. District Court, Central District of California, Plaintiff Specialized Bicycle Components Inc.'s Opening Claim Construction Brief, Jul. 15, 2005.

U.S. District Court, Central District of California, ONSPORT, LLC's Opening Claim Construction Memorandum, Jul. 29, 2005.

U.S. District Court Central District of California, Specialized Bicycle Components, Inc.'s Reply Brief in Support of Claim Construction Brief, Aug. 12, 2005.

* cited by examiner

BICYCLE DAMPING ENHANCEMENT SYSTEM

RELATED APPLICATIONS

This application is a continuation of U.S. patent application Ser. No. 09/919,582, filed Jul. 31, 2001 now U.S. Pat. No. 6,772,678, which is a continuation of U.S. patent application Ser. No. 09/288,003, filed Apr. 6, 1999, now U.S. Pat. No. 6,267,400.

INCORPORATION BY REFERENCE

The entireties of U.S. patent application Ser. No. 09/919, 582, filed Jul. 31, 2001, and U.S. patent application Ser. No. 09/288,003, filed Apr. 6, 1999, are hereby expressly incorporated by reference herein and made a part of this specification.

BACKGROUND OF THE INVENTION

1. Field of the Invention

This invention relates generally to the field of bicycle suspensions. More particularly, the invention relates to a damping enhancement system for a bicycle.

2. Description of the Related Art

For many years bicycles were constructed using exclusively rigid frame designs. These conventional bicycles relied on air-pressurized tires and a small amount of natural flexibility in the frame and front forks to absorb the bumps of the road and trail. This level of shock absorption was generally considered acceptable for bicycles which were ridden primarily on flat, well maintained roads. However, as "off-road" biking became more popular with the advent of All Terrain Bicycles ("ATBs"), improved shock absorption systems were needed to improve the smoothness of the ride over harsh terrain. As a result, new shock absorbing bicycle suspensions were developed.

Figure 1:
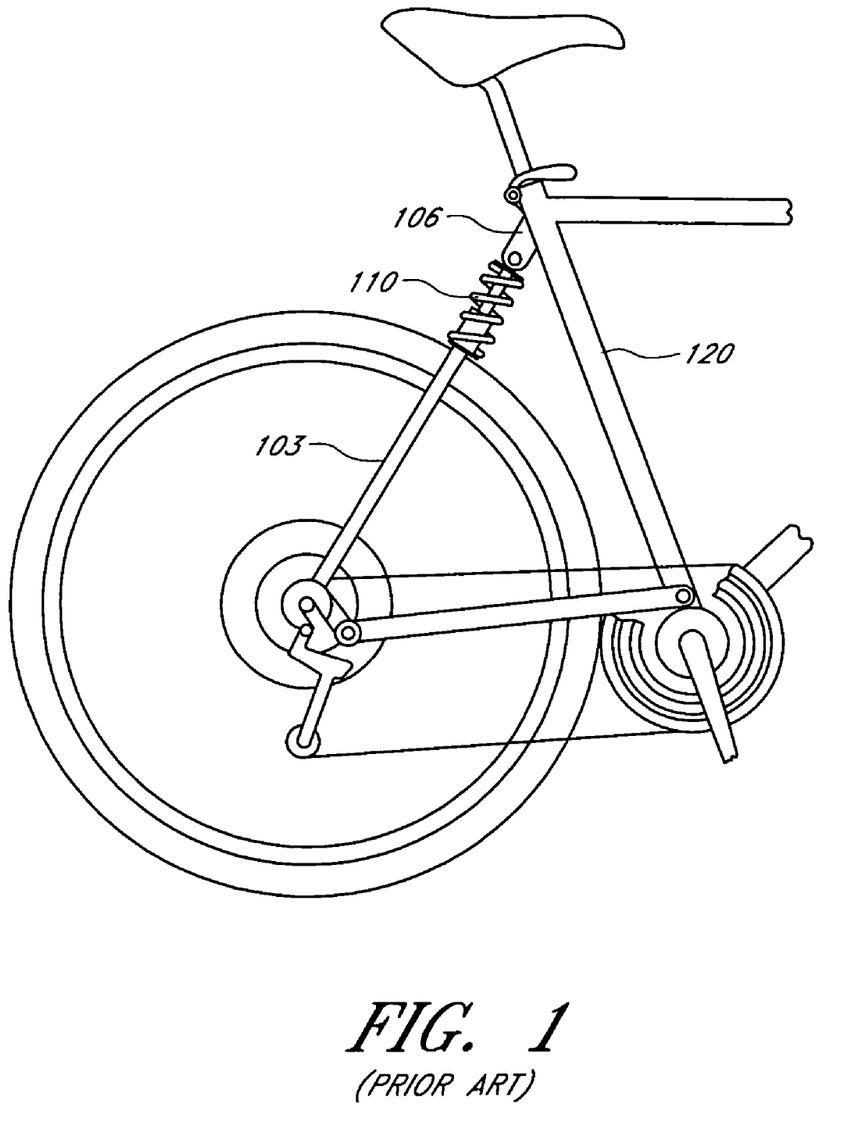
FIG. 1 illustrates a prior art rear suspension configuration for a bicycle.
Figure 2:
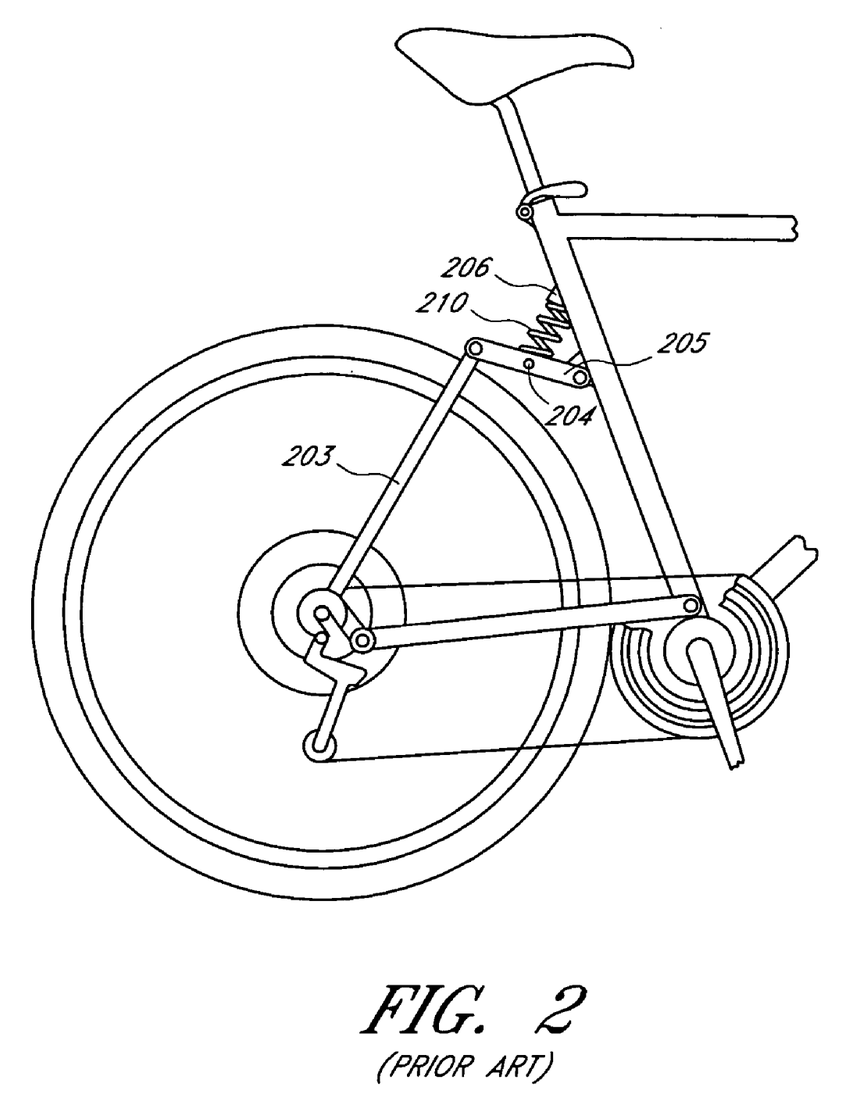
FIG. 2 illustrates a prior art rear suspension configuration for a bicycle.

Two such suspension systems are illustrated in FIGS. 1 and 2. These two rear suspension designs are described in detail in Leitner, U.S. Pat. No. 5,678,837, and Leitner, U.S. Pat. No. 5,509,679, which are assigned to the assignee of the present application. Briefly, FIG. 1 illustrates a telescoping shock absorber 110 rigidly attached to the upper arm members 103 of the bicycle on one end and pivotally attached to the bicycle seat tube 120 at the other end (point 106). FIG. 2 employs another embodiment wherein a lever 205 is pivotally attached to the upper arm members 203 and the shock absorber 210 is pivotally attached to the lever 205 at an intermediate position 204 between the ends of the lever 205.

There are several problems associated with the conventional shock absorbers employed in the foregoing rear suspension systems. One problem is that conventional shock absorbers are configured with a fixed damping rate. As such, the shock absorber can either be set "soft" for better wheel compliance to the terrain or "stiff" to minimize movement during aggressive pedaling of the rider. However, there is no mechanism in the prior art which provides for automatic adjustment of the shock absorber setting based on different terrain and/or pedaling conditions.

A second, related problem with the prior art is that conventional shock absorbers are only capable of reacting to the relative movement between the bicycle chassis and the wheel. In other words, the shock absorber itself has no way of differentiating between forces caused by the upward movement of the wheel (i.e., due to contact with the terrain) and forces caused by the downward movement of the chassis (i.e., due to movement of the rider's mass).

Thus, most shock absorbers are configured somewhere in between the "soft" and "stiff" settings (i.e., at an intermediate setting). Using a static, intermediate setting in this manner means that the "ideal" damper setting—i.e., the perfect level of stiffness for a given set of conditions—will never be fully realized. For example, a rider, when pedaling hard for maximum power and efficiency, prefers a rigid suspension whereby human energy output is vectored directly to the rotation of the rear wheel. By contrast, a rider prefers a softer suspension when riding over harsh terrain. A softer suspension setting improves the compliance of the wheel to the terrain which, in turn, improves the control by the rider.

Accordingly, what is needed is a damping system which will dynamically adjust to changes in terrain and/or pedaling conditions. What is also needed is a damping system which will provide to a "stiff" damping rate to control rider-induced suspension movement and a "soft" damping rate to absorb forces from the terrain. Finally, what is needed is a damping system which will differentiate between upward forces produced by the contact of the wheel with the terrain and downward forces produced by the movement of the rider's mass.

SUMMARY OF THE INVENTION

A bicycle shock absorber for differentiating between rider-induced forces and terrain-induced forces including a first fluid chamber having fluid contained therein. A piston is configured to compress the fluid within the fluid chamber. A second fluid chamber is coupled to the first fluid chamber by a fluid communication hose and an inertial valve is disposed within the second fluid chamber. The inertial valve is configured to open in response to terrain-induced forces and provides communication of fluid compressed by the piston from the first fluid chamber to the second fluid chamber. The inertial valve does not open in response to rider-induced forces and prevents communication of the fluid compressed by the piston from the first fluid chamber to the second fluid chamber.

BRIEF DESCRIPTION OF THE DRAWINGS

A better understanding of the present invention can be obtained from the following detailed description in conjunction with the following drawings, in which.

DETAILED DESCRIPTION OF THE PREFERRED EMBODIMENT

A damping enhancement system is described which differentiates between upward forces produced by the contact of the bicycle wheel with the terrain and downward forces produced by the movement of the rider's mass. In the following description, for the purposes of explanation, numerous specific details are set forth in order to provide a thorough understanding of the present invention. It will be apparent, however, to one of ordinary skill in the art that the present invention may be practiced without some of these specific details. In other instances, certain well-known structures are illustrated and described in limited detail to avoid obscuring the underlying principles of the present invention.

An Embodiment of the Damper Enhancement System

Figure 3:
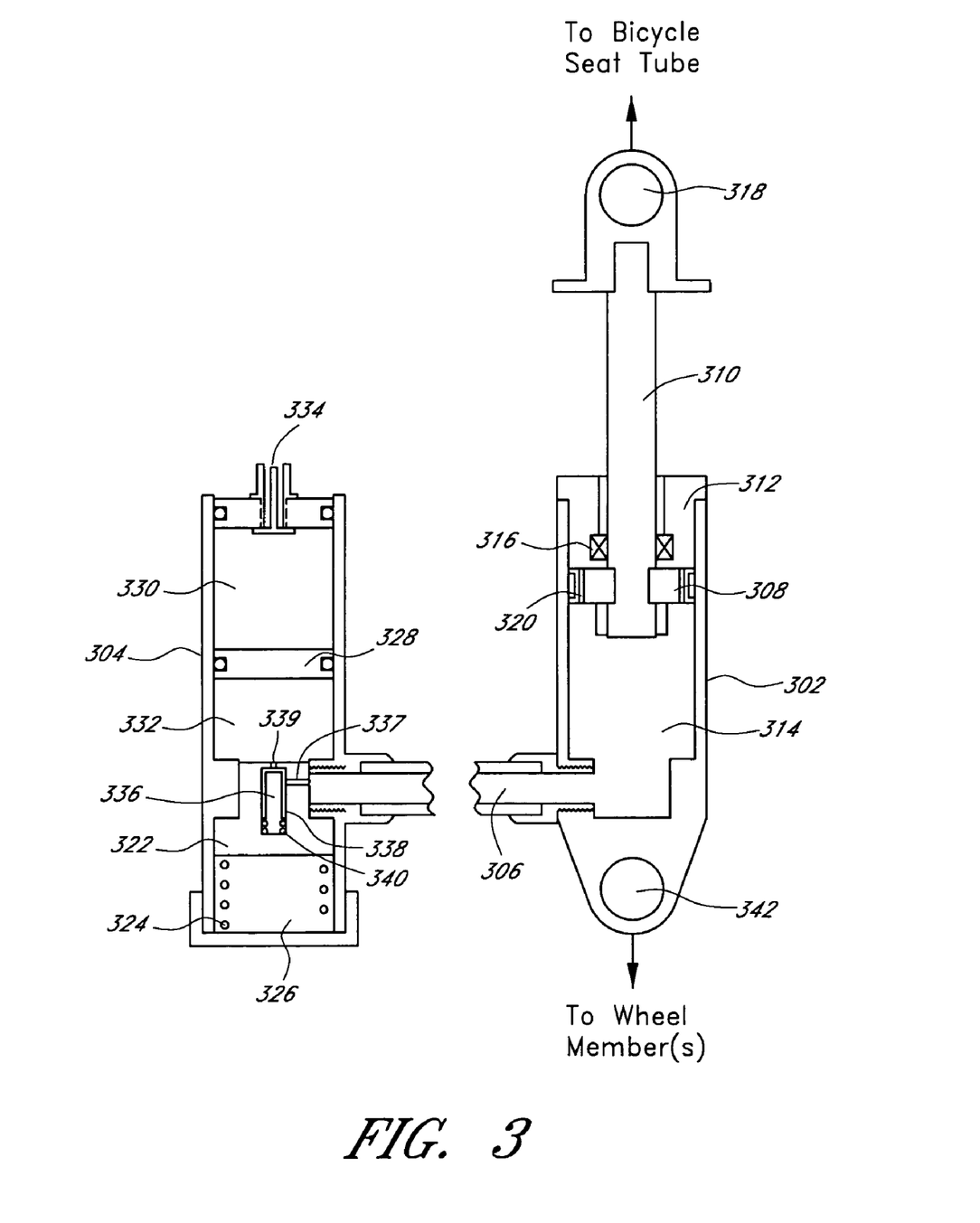
FIG. 3 illustrates one embodiment of the present invention.

One embodiment of the present damper enhancement system is illustrated in FIG. 3. The apparatus is comprised generally of a primary tube 302 and a remote tube 304 coupled via a connector hose 306.

The damper enhancement system described hereinafter may be coupled to a bicycle in the same manner as contemporary shock absorbers (i.e., such as those illustrated in FIGS. 1 and 2). For example, the damper enhancement system may be coupled to a bicycle as illustrated in FIG. 1 wherein the upper mount 318 is pivotally coupled to the seat tube at point 106 and the lower mount 342 is fixedly coupled to the upper arm member 103. Moreover, the damper enhancement system may be coupled to a bicycle as illustrated in FIG. 2 wherein the upper mount 318 is pivotally coupled to the seat tube at a point 206 and the lower mount 342 is fixedly coupled to a point 204 on lever 211. These two constructions are illustrated in FIGS. 8–9 and FIGS. 10–11, respectively.

Figure 8:
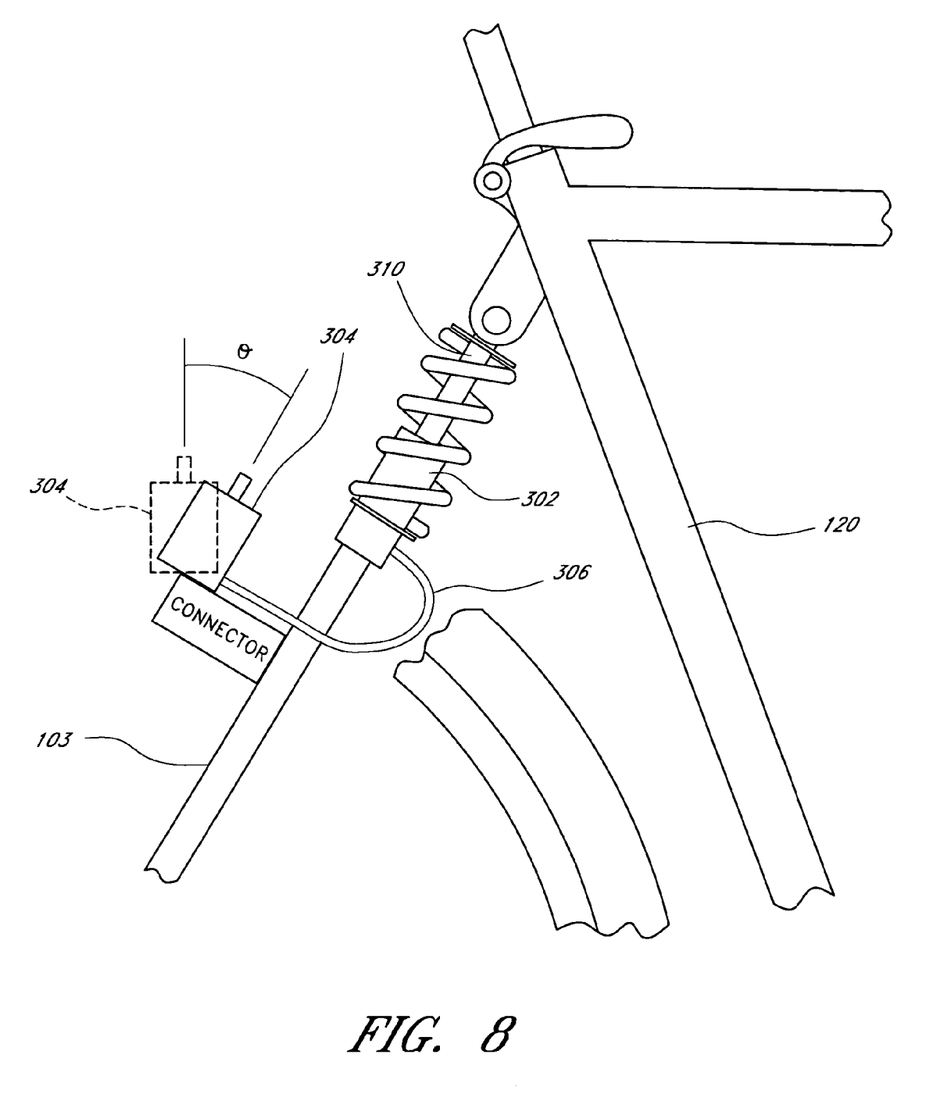
FIG. 8 is an enlarged schematic view of an embodiment of the present invention wherein the primary tube is mounted directly to an upper arm member and the remote tube is connected to an upper arm member of a bicycle. An angled position of the remote tube is shown in phantom.
Figure 9:
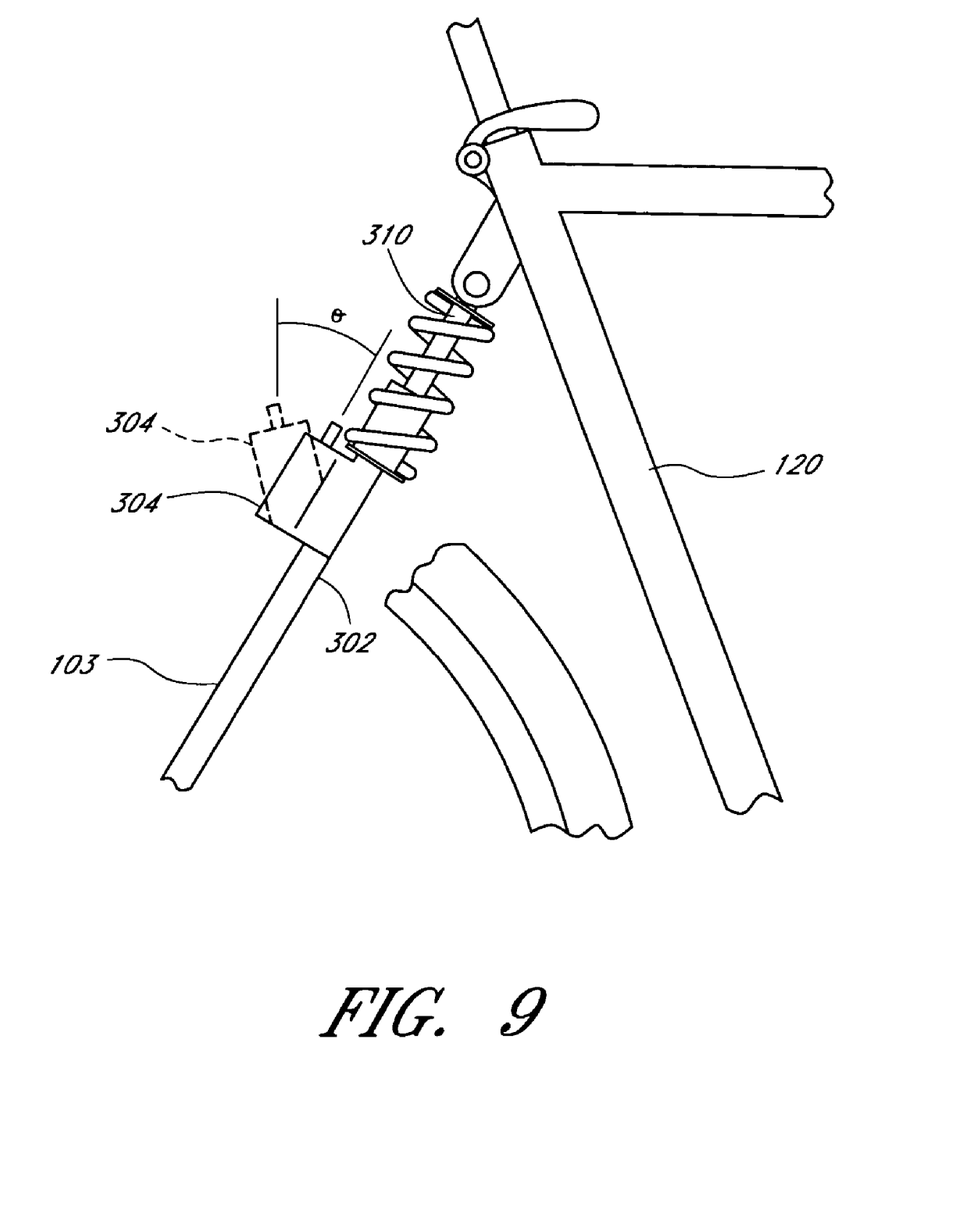
FIG. 9 is an enlarged schematic view of an embodiment of the present invention wherein the primary tube is mounted directly to an upper arm member and the remote tube and the primary tube are a single unit. An angled position of the remote tube is shown in phantom.
Figure 10:
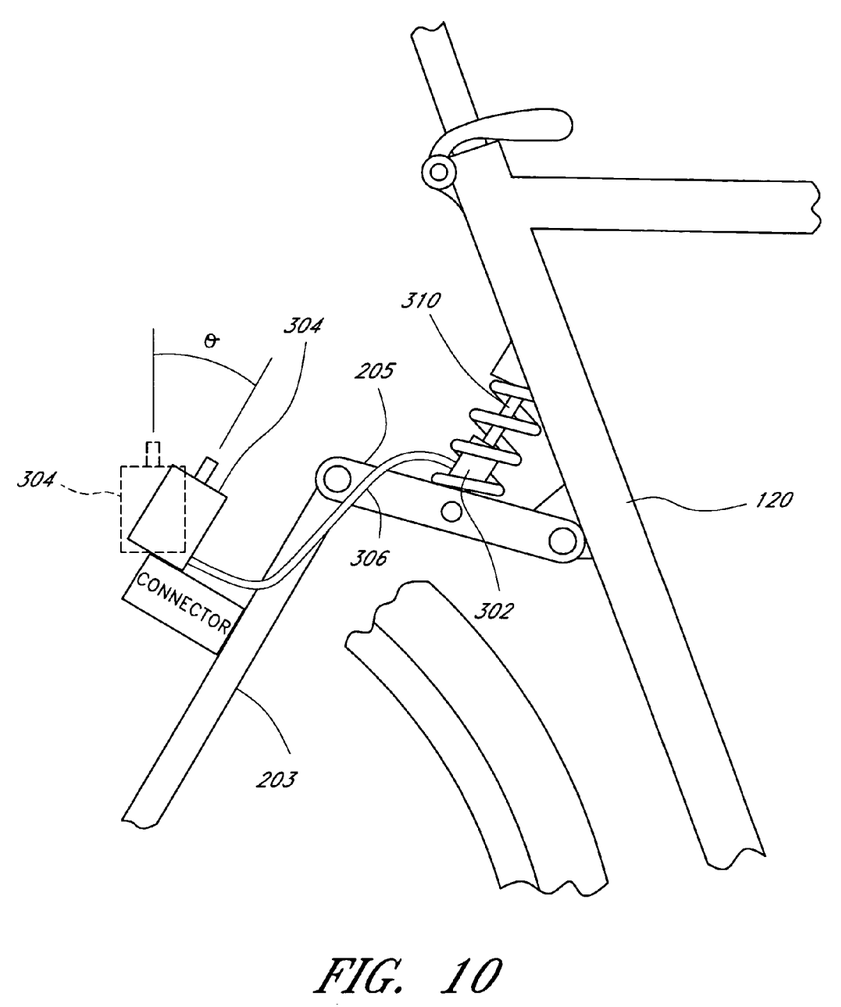
FIG. 10 is an enlarged schematic view of embodiment of the present invention wherein the primary tube is mounted to a lever and the remote tube is connected to an upper arm member of a bicycle. An angled position of the remote tube is shown in phantom.
Figure 11:
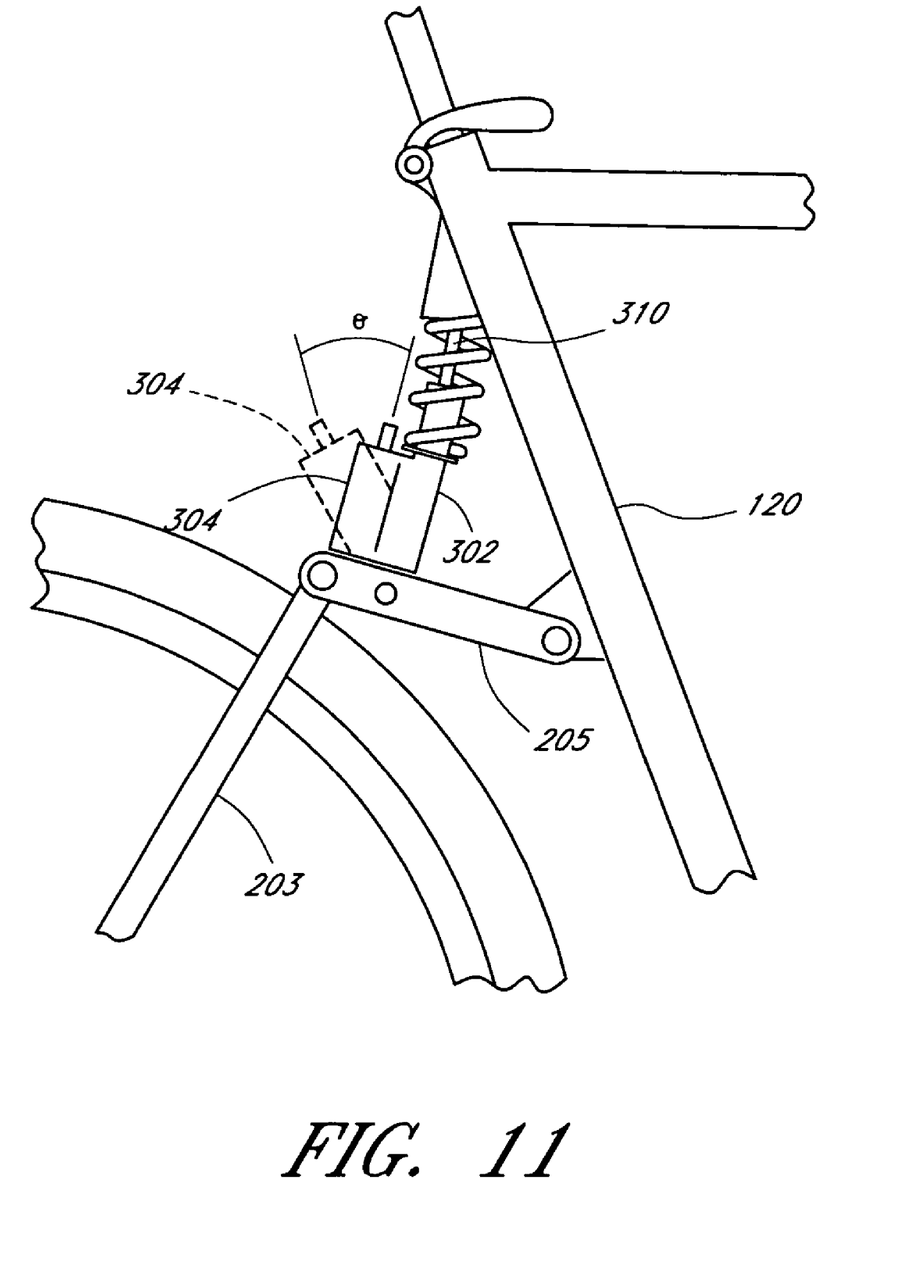
FIG. 11 is an enlarged schematic view of an embodiment of the present invention wherein the primary tube is mounted to a lever and the remote tube and the primary tube are a single unit. An angled position of the remote tube is shown in phantom.

In addition, depending on the particular embodiment of the damper enhancement system, the connector hose may be of varying lengths and made from varying types of material. For example, the connector hose 306 may be short and comprised of metal. In this case, the primary tube 302 and the remote tube 304 will be closely coupled together—possibly in a single unit. Such a construction is illustrated in FIG. 9 and FIG. 11. By contrast the connector hose may be long and comprised of a flexible material. In this case, the remote tube 304 may be separated from the primary tube 302 and may be independently connected to the bicycle (e.g., the remote tube may be connected to one of the wheel members such as upper arm member 103 in FIG. 1). FIG. 8 and FIG. 10 illustrate such a construction, wherein the primary tube 302 is coupled to upper arm member 103 and the remote tube 304 is connected to the upper arm member 103 by a connector. Regardless of how the remote tube 304 is situated in relation to the primary tube 302, however, the underlying principles of the present invention will remain the same.

A piston 308 on the lower end of a piston rod 310 divides the inside of the primary tube 302 into and upper fluid chamber 312 and a lower fluid chamber 314 which are both filled with a viscous fluid such as oil. The piston rod 310 is sealed through the cap with oil seals 316 and an upper mount 318 connects the piston to the chassis or sprung weight of the bicycle (e.g., to the seat tube). A lower mount 342 connects the primary tube 302 to the rear wheel of the bicycle via one or more wheel members (e.g., upper arm members 103 in FIG. 1 or lever 205 of FIG. 2). Longitudinally extending passages 320 in the piston 308 provide for limited fluid communication between the upper fluid chamber 312 and lower fluid chamber 314.

An inertial valve 322 which is slightly biased by a lightweight spring 324 moves within a chamber 326 of the remote tube 304. The lightweight spring 324 is illustrated in a fully extended state and, as such, the inertial valve 322 is illustrated at one endmost position within its full range of motion. In this position, fluid flow from the primary tube 302 to the remote tube 304 via the connector hose 306 is blocked or reduced. By contrast, when the lightweight spring 324 is in a fully compressed state, the inertial valve resides beneath the interface between the remote tube 304 and the connector hose 306. Accordingly, in this position, fluid flow from the primary tube 302 to the remote tube 304 through the connector hose 306 is enabled. In one embodiment, the inertial valve 322 is composed of a dense, heavy metal such as brass.

Disposed within the body of the inertial valve 322 is a fluid return chamber 336, a first fluid return port 337 which couples the return chamber 336 to the connector hose 306, and a second fluid return port 339 which couples the return chamber 336 to remote fluid chamber 332. A fluid return element 338 located within the fluid return chamber 336 is biased by another lightweight spring 340 (hereinafter referred to as a "fluid return spring"). In FIG. 3 the fluid return spring 340 is illustrated in its fully extended position. In this position, the fluid return element 338 separates (i.e., decouples) the fluid return chamber 336 from the fluid return port 337. By contrast, when the fluid return spring 340 is in its fully compressed position, the fluid return element 338 no longer separates the fluid return chamber 336 from the fluid return port 337. Thus, in this position, fluid flow from the fluid return chamber 336 to the connector hose 306 is enabled. The operation of the inertial valve 322 and the fluid return mechanism will be described in detail below.

The remaining portion of the remote tube 304 includes a floating piston 328 which separates a gas chamber 330 and a fluid chamber 332. In one embodiment of the present invention, the gas chamber 330 is pressurized with Nitrogen (e.g., at 150 p.s.i.) and the fluid chamber 332 is filled with oil. An air valve 334 at one end of the remote tube 322 allows for the gas chamber 330 pressure to be increased or decreased as required.

The operation of the damping enhancement system will be described first with respect to downward forces produced by the movement of the rider (and the mass of the bicycle frame) and then with respect to forces produced by the impact between the wheel and the terrain.

1. Forces Produced by the Rider

Figure 4:
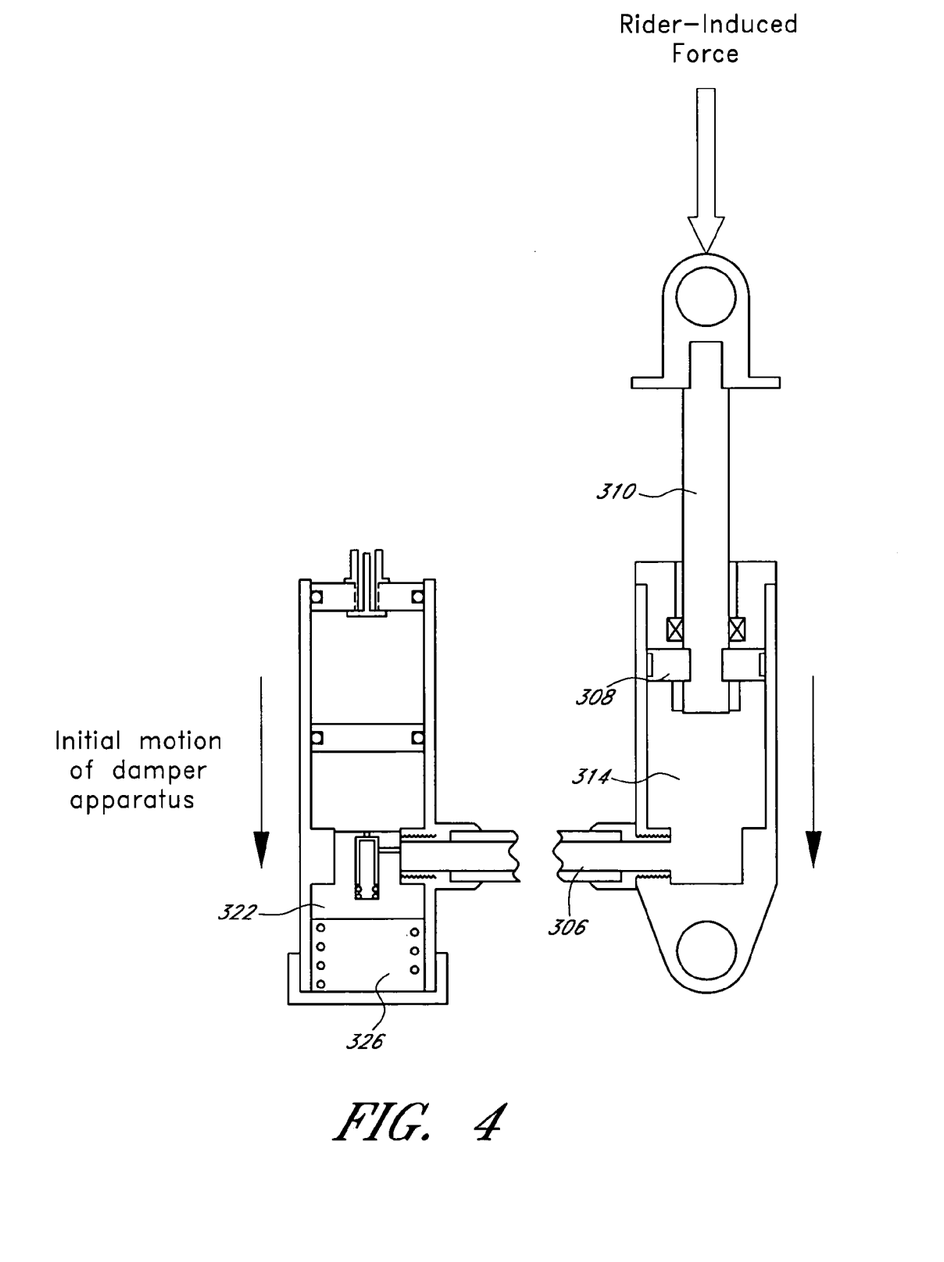
FIG. 4 illustrates an embodiment of the present invention reacting to a rider-induced force.

A rider-induced force is illustrated in FIG. 4, forcing the piston arm 310 in the direction of the lower fluid chamber 314. In order for the piston 308 to move into fluid chamber 314 in response to this force, fluid (e.g., oil) contained within the fluid chamber 314 must be displaced. This is due to the fact that fluids such as oil are not compressible. If lightweight spring 324 is in a fully extended state as shown in FIG. 4, the inertial valve 322 will be "closed" (i.e., will block or reduce the flow of fluid from lower fluid chamber 314 through the connector hose 306 into the remote fluid chamber 332). Although the entire apparatus will tend to move in a downward direction in response to the rider-induced force, the inertial valve 322 will remain in the nested position shown in FIG. 4 (i.e., it is situated as far towards the top of chamber 326 as possible). Accordingly, because the fluid in fluid chamber 314 has no where to flow in response to the force, the piston 308 will not move down into fluid chamber 314 to any significant extent. As a result, a "stiff" damping rate will be produced in response to rider-induced forces (i.e., forces originating through piston rod 310).

2. Forces Produced by the Terrain

Figure 5:
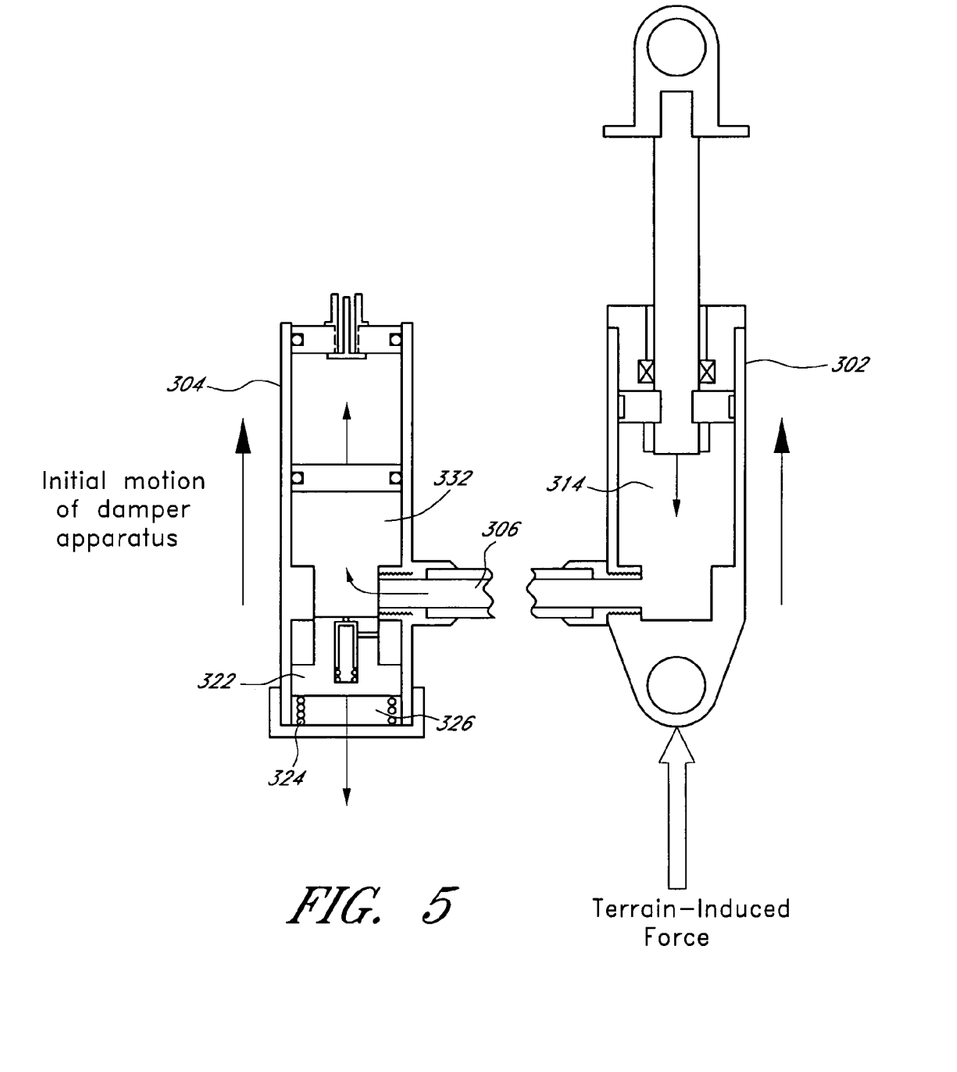
FIG. 5 illustrates an embodiment of the present invention reacting to a terrain-induced force.

As illustrated in FIG. 5, the damping enhancement system will respond in a different manner to forces originating from the terrain and transmitted through the bicycle wheel (hereinafter "terrain-induced forces"). In response to this type of force, the inertial valve 322 will move downward into chamber 326 as illustrated and will thereby allow fluid to flow from lower chamber 314 into remote chamber 332 via connector hose 306. The reason for this is that the entire apparatus will initially move in the direction of the terrain-induced force while the inertial valve 322 will tend to remain stationary because it is comprised of a dense, heavy material (e.g., such as brass). Thus, the primary tube 302 and the remote tube 304 will both move in a generally upward direction and, relative to this motion, the inertial valve 322 will move downward into chamber 326 and compress the lightweight spring 324. As illustrated in FIG. 5 this is the inertial valve's "open" position because it couples lower fluid chamber 314 to remote fluid chamber 332 (via connector hose 306).

Once the interface between connector hose 306 and remote fluid chamber 332 is unobstructed, fluid from lower fluid chamber 314 will flow across connector hose 306 into remote fluid chamber 332 in response to the downward force of piston 308 (i.e., the fluid can now be displaced). As remote fluid chamber 314 accepts additional fluid as described, floating piston 328 will move towards gas chamber 330 (in an upward direction in FIG. 5), thereby compressing the gas in gas chamber 330. The end result, will be a "softer" damping rate in response to terrain-induced forces (i.e., forces originating from the wheels of the bicycle).

Once the inertial valve moves into an "open" position as described above, it will eventually need to move back into a "closed" position so that a stiff damping rate can once again be available for rider-induced forces. Thus, lightweight spring 324 will tend to move the inertial valve 322 back into its closed position. In addition, the return spring surrounding primary tube 302 (FIGS. 8–11) will pull piston rod 310 and piston 308 in an upward direction out of lower fluid chamber 314. In response to the motion of piston 308 and to the compressed gas in gas chamber 330, fluid will tend to flow from remote fluid chamber 332 back to lower fluid chamber 314 (across connector hose 306).

Figure 6:
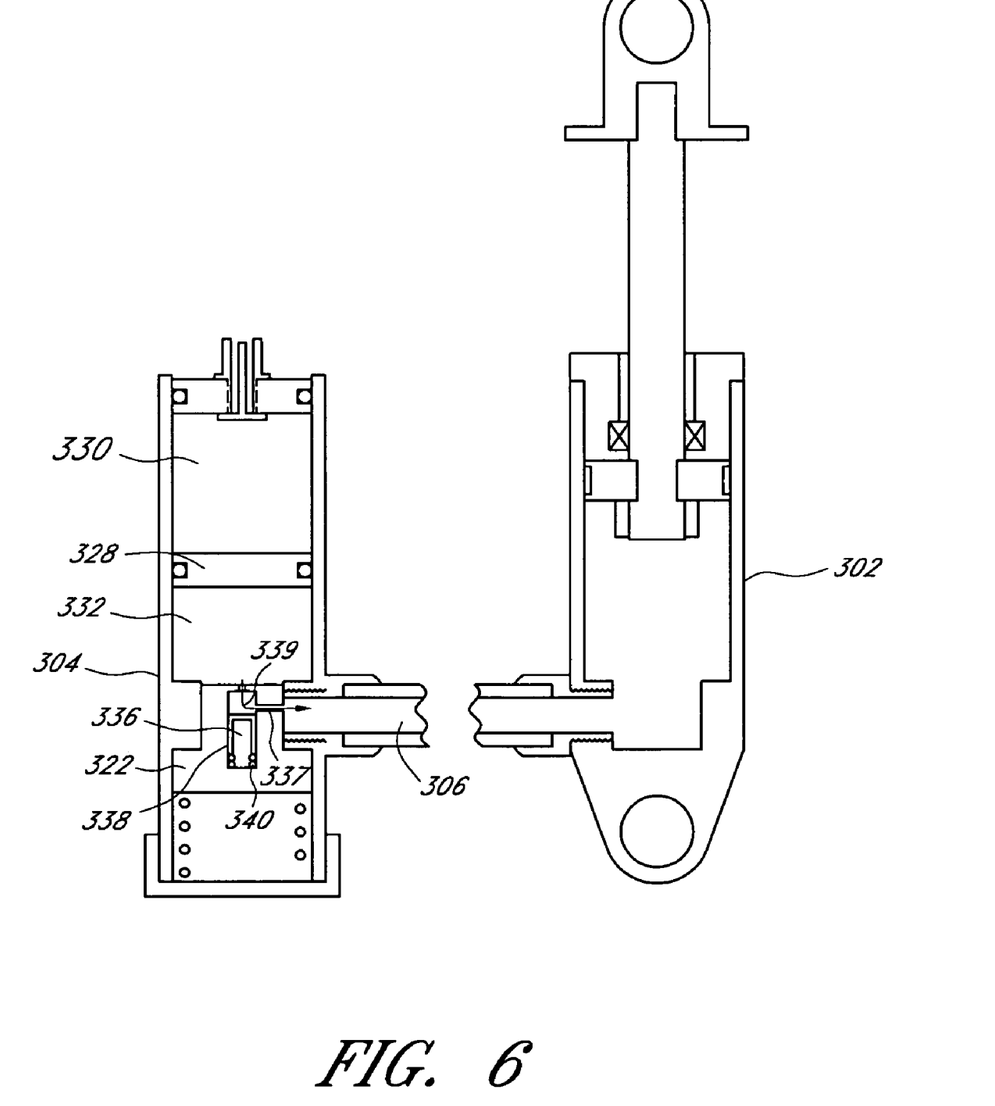
FIG. 6 illustrates the fluid refill mechanism of an embodiment of the present invention.

To allow fluid to flow in this direction even when inertial valve 322 is in a closed position, inertial valve 322 (as described above) includes the fluid return elements described above. Thus, as illustrated in FIG. 6, in response to pressurized gas in gas chamber 330, fluid in remote fluid chamber 332 will force fluid return element 338 downward into fluid return chamber 336 (against the force of the fluid return spring 340). Once fluid return element 338 has been forced down below fluid return port 337, fluid will flow from remote fluid chamber 332 through fluid return port 339, fluid return chamber 336, fluid return port 337, connector hose 306, and finally back into lower fluid chamber 314. This will occur until the pressure in remote fluid chamber 336 is low enough so that fluid return element 338 can be moved back into a "closed" position (i.e., when the force of fluid return spring 340 is greater than the force created by the fluid pressure).

The sensitivity of inertial valve 322 may be adjusted by changing the angle with which it is positioned in relation to the terrain-induced force. For example, in FIG. 5, the inertial valve 322 is positioned such that it's movement in chamber 326 is parallel (and in the opposite direction from) to the terrain-induced force. This positioning produces the greatest sensitivity from the inertial valve 322 because the entire terrain-induced force vector is applied to the damper enhancement system in the exact opposite direction of the inertial valve's 322 line of movement.

By contrast, if the remote tube containing the inertial valve 322 were positioned at, for example, a 45 degree angle from the position shown in FIG. 5 the inertial valve's 322 sensitivity would be decreased by approximately one half because only one half of the terrain-induced force vector would be acting to move the damper enhancement system in the opposite direction of the valve's line of motion. Thus, twice the terrain-induced force would be required to trigger the same response from the inertial valve 322 in this angled configuration. FIGS. 8–11 illustrate the remote tube 304 positioned at an angle from the primary tube 302 (shown in phantom), With such a construction, the sensitivity of the inertial value 322 may be adjusted as described immediately above.

Thus, in one embodiment of the damper enhancement system the angle of the remote tube 304 in which the inertial valve 322 resides is manually adjustable to change the inertial valve 322 sensitivity. This embodiment may further include a sensitivity knob or dial for adjusting the angle of the remote tube 304. The sensitivity knob may have a range of different sensitivity levels disposed thereon for indicating the particular level of sensitivity to which the damper apparatus is set. In one embodiment the sensitivity knob may be rotatably coupled to the bicycle frame separately from the remote tube, and may be cooperatively mated with the remote tube (e.g., with a set of gears). Numerous different configurations of the sensitivity knob and the remote tube 304 are possible within the scope of the underlying invention. The connector hose 306 of this embodiment is made from a flexible material such that the remote tube 304 can be adjusted while the primary tube remains in a static position.

Figure 7:
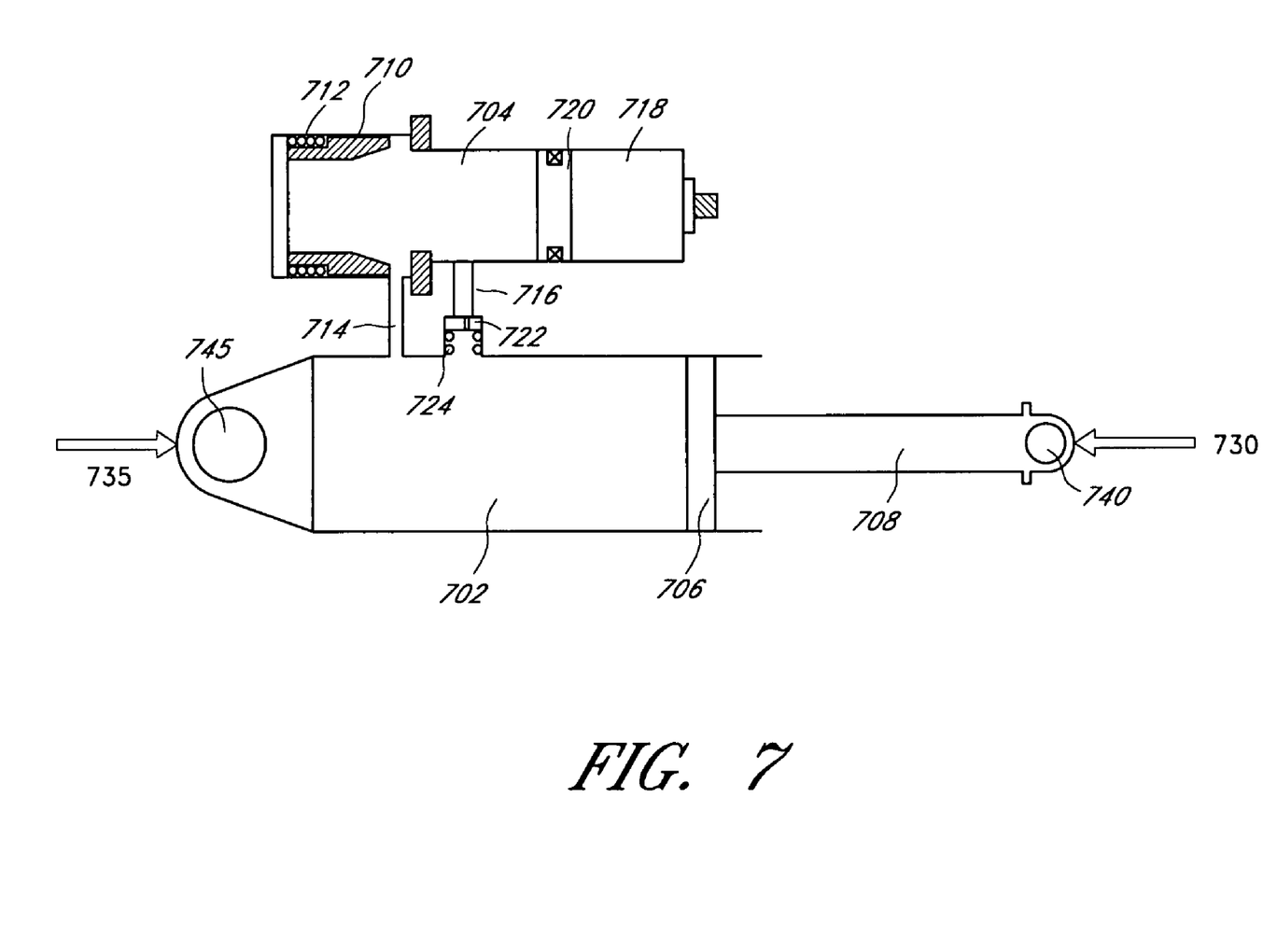
FIG. 7 illustrates another embodiment of the present invention.

Another embodiment of the damper enhancement system is illustrated in FIG. 7. Like the previous embodiment, this embodiment includes a primary fluid chamber 702 and a remote fluid chamber 704. A piston 706 coupled to a piston shaft 708 moves within the primary fluid chamber 702. The primary fluid chamber 702 is coupled to the remote fluid chamber via an inlet port 714 (which transmits fluid from the primary fluid chamber 702 to the remote fluid chamber 704)

and a separate refill port 716 (which transmits fluid from the remote fluid chamber 704 to the primary fluid chamber 702).

An inertial valve 710 biased by a lightweight spring 712 resides in the remote fluid chamber 704. A floating piston 720 separates the remote fluid chamber from a gas chamber 718. In response to terrain-induced forces (represented by force vector 735), the inertial valve, due to its mass, will compress the lightweight spring 712 and allow fluid to from primary fluid chamber 702 to remote fluid chamber 704 over inlet port 714. This will cause floating piston 720 to compress gas within gas chamber 718.

After inertial valve 710 has been repositioned to it's "closed" position by lightweight spring 712, fluid in remote fluid chamber 704 will force fluid refill element 722 open (i.e., will cause fluid refill spring 724 to compress). Thus, fluid will be transmitted from remote fluid chamber 704 to primary fluid chamber 702 across refill port 716 until the pressure of the fluid in remote fluid chamber is no longer enough to keep fluid refill element 722 open. Thus, the primary difference between this embodiment and the previous embodiment is that this embodiment employs a separate refill port 716 rather than configuring a refill port within the inertial valve itself.

What is claimed is:

1. A suspension assembly for a bicycle, comprising:
  a primary tube;
  a piston rod supporting a piston and being capable of motion relative to said primary tube in a compression direction of said suspension assembly, said piston and said primary tube at least partially defining a first fluid chamber, wherein one of said primary tube and said piston rod is configured to be connected to a wheel portion of the bicycle and the other of said primary tube and said piston rod is configured to be connected to a frame portion of the bicycle;
  a secondary tube at least partially defining a second fluid chamber, wherein said first fluid chamber and said second fluid chamber are filled with a liquid and wherein liquid flows from said first fluid chamber to said second fluid chamber in response to relative motion of said piston rod and said primary tube in said compression direction;
  an inertial valve comprising an inertial mass, said inertial mass being within said secondary tube and not within said first fluid chamber, wherein said inertia mass does not surround said primary tube, said inertial mass configured to move axially relative to said secondary tube in generally a same direction as movement of said piston in response to a terrain-induced force tending to move said suspension assembly in said compression direction, said inertial valve having a first position and a second position, said inertial valve biased into said first position blocking a flow of liquid from said first fluid chamber to said second fluid chamber in said compression direction, said inertial valve permitting a flow of liquid from said first fluid chamber to said second fluid chamber in said second position in said compression direction; and
  a floating piston within said secondary tube and separating a gas space of said secondary tube from a damping fluid space of said secondary tube.

2. The bicycle suspension system of claim 1, additionally comprising a stop surface configured to prevent said inertia mass from moving beyond said first position of said inertial valve in a direction opposite said second position.

3. A suspension assembly for a bicycle, comprising:
  a first tube;
  a second tube;
  a piston rod supporting a piston and being capable of motion relative to said first tube in a compression direction of said suspension assembly, wherein one of said first tube and said piston rod is configured to be connected to a wheel portion of a bicycle and the other of said first tube and said piston rod is configured to be connected to a frame portion of a bicycle;
  a first fluid chamber and a second fluid chamber, wherein said first fluid chamber and said second fluid chamber are filled with oil and wherein oil flows from said first fluid chamber to said second fluid chamber in response to relative motion of said piston rod and said first tube in said compression direction;
  an inertial valve comprising an inertial mass, said inertial mass being within said second tube and not within said first fluid chamber, wherein said inertia mass does not surround said first tube, said inertial mass configured to move axially relative to said second tube in generally a same direction as movement of said piston in response to a terrain-induced force tending to move said suspension assembly in said compression direction, said inertial valve having a first position and a second position, said inertial valve biased into said first position blocking a flow of oil from said first fluid chamber to said second fluid chamber in said first position in said compression direction, said inertial valve permitting a flow of oil from said first fluid chamber to said second fluid chamber in said second position in said compression direction; and
  a floating piston within said second tube and separating a gas space of said second tube from a damping fluid space of said second tube.

4. The bicycle suspension system of claim 3, additionally comprising a stop surface configured to prevent said inertia mass from moving beyond said first position of said inertial valve in a direction opposite said second position.

5. A bicycle suspension assembly, comprising:
  a tube defining an axis;
  a piston rod supporting a piston in sealed, sliding engagement with said tube, said piston and said tube defining a compression fluid chamber and a rebound fluid chamber;
  an opening communicating with said compression fluid chamber, wherein a damping fluid moves between said compression fluid chamber and said rebound fluid chamber in response to movement of said piston rod relative to said tube in a compression direction;
  a floating piston configured to separate a damping fluid within said suspension fluid from a gas chamber, said suspension fluid comprising a valve configured to permit adjustment of a pressure within said gas chamber; and
  an inertia valve comprising an inertia mass movable between a closed position and an open position, said inertia mass not within said compression fluid chamber or said rebound fluid chamber, wherein said inertia mass does not surround said tube, said inertia mass configured to move in an axial direction generally aligned with said axis;
  a spring, said spring configured to apply a force to said suspension assembly tending to extend said piston rod relative to said tube;
  wherein the suspension assembly operative, in the absence of a terrain-induced upward acceleration of said suspension assembly above a predetermined threshold sufficient to move said inertia valve to said open position, to prevent significant compressive movement of said suspension assembly in response to rider-induced pedaling forces on said suspension assembly, and wherein said inertia valve is movable to said open position in response to a terrain-induced upward acceleration of said suspension assembly above said threshold to permit significant compressive movement of said suspension assembly.

6. The bicycle suspension assembly of claim 5, additionally comprising a stop surface configured to prevent said inertia mass from moving beyond said closed position of said inertia valve in a direction opposite said second position.

7. The bicycle suspension assembly of claim 5, wherein said axial direction of movement of said inertia mass is non-coaxial with said axis of said tube.

8. A bicycle suspension assembly, comprising:
a damper, said damper comprising:
   a tube;
   a piston rod supporting a piston in sealed, sliding engagement with said tube, said piston and said tube defining a compression fluid chamber and a rebound fluid chamber, wherein a damping fluid moves between said compression chamber and said rebound chamber during compression movement of said suspension assembly and said piston rod occupies a successively greater portion of said tube during said compression movement;
   an opening communicating with said compression chamber;
   an inertia valve comprising an inertia mass, said inertia valve having an open position wherein said inertia mass does not block said opening and a flow of damping fluid is permitted through said opening, said inertia valve normally biased to a closed position wherein said inertia mass is positioned to block said opening such that said flow of damping fluid through said opening is reduced relative to said open position of said inertia valve;
a spring, said spring configured to apply a force to said suspension assembly tending to extend said piston rod relative to said tube;
wherein said spring and said damper cooperate, in the absence of a terrain-induced upward acceleration of said suspension assembly above a predetermined threshold sufficient to move said inertia valve to said open position, to prevent significant compressive movement of said suspension assembly in response to rider-induced pedaling forces on said suspension assembly, and wherein said inertia valve is movable to said open position in response to a terrain-induced upward acceleration of said suspension assembly above said threshold to permit significant compressive movement of said suspension assembly.

9. The bicycle suspension assembly of claim 8, additionally comprising a floating piston separating a gas space from damping fluid within said damper.

10. The bicycle suspension assembly of claim 9, wherein said floating piston resides within a reservoir chamber of said suspension assembly.

11. The bicycle suspension assembly of claim 8, additionally comprising a stop surface configured to prevent said inertia mass from moving beyond said closed position of said inertia valve in a direction opposite said open position.

12. The bicycle suspension assembly of claim 8, wherein said inertia mass moves in an axial direction that is non-coaxial with a longitudinal axis of said tube.

* * * * *